(12) United States Patent
Soundararajan et al.

(10) Patent No.: US 9,069,680 B2
(45) Date of Patent: Jun. 30, 2015

(54) METHODS AND SYSTEMS FOR DETERMINING A CACHE SIZE FOR A STORAGE SYSTEM

(71) Applicant: NetApp, Inc., Sunnyvale, CA (US)

(72) Inventors: Gokul Soundararajan, Sunnyvale, CA (US); Lakshmi Narayanan Bairavasundaram, Sunnyvale, CA (US); Vipul Mathur, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 176 days.

(21) Appl. No.: 13/963,875

(22) Filed: Aug. 9, 2013

(65) Prior Publication Data

US 2015/0046653 A1 Feb. 12, 2015

(51) Int. Cl.
*G06F 12/08* (2006.01)

(52) U.S. Cl.
CPC ........ *G06F 12/0873* (2013.01); *G06F 12/0811* (2013.01)

(58) Field of Classification Search
None
See application file for complete search history.

(56) References Cited

U.S. PATENT DOCUMENTS

| | | | | |
|---|---|---|---|---|
| 7,478,218 | B2* | 1/2009 | Bruening et al. | 711/170 |
| 7,856,531 | B2* | 12/2010 | Bruening et al. | 711/129 |
| 8,141,058 | B2* | 3/2012 | Berg et al. | 717/131 |
| 8,443,341 | B2* | 5/2013 | Berg et al. | 717/131 |
| 8,539,455 | B2* | 9/2013 | Berg et al. | 717/131 |
| 8,769,202 | B1* | 7/2014 | Soundararajan et al. | 711/118 |
| 8,812,454 | B2* | 8/2014 | Puttaswamy Naga et al. | 707/661 |
| 2006/0190924 | A1* | 8/2006 | Bruening et al. | 717/104 |
| 2008/0244533 | A1* | 10/2008 | Berg et al. | 717/128 |
| 2009/0055594 | A1* | 2/2009 | Berg et al. | 711/136 |
| 2009/0125465 | A1* | 5/2009 | Berg et al. | 706/17 |
| 2009/0204768 | A1* | 8/2009 | Bruening et al. | 711/136 |
| 2013/0166724 | A1* | 6/2013 | Bairavasundaram et al. | 709/224 |
| 2013/0185229 | A1* | 7/2013 | Naga et al. | 705/418 |
| 2014/0310463 | A1* | 10/2014 | Soundararajan et al. | 711/118 |
| 2014/0351531 | A1* | 11/2014 | Puttaswamy Naga et al. | 711/159 |

* cited by examiner

*Primary Examiner* — Kevin Verbrugge
(74) *Attorney, Agent, or Firm* — Perkins Coie LLP

(57) ABSTRACT

Technology for operating a cache sizing system is disclosed. In various embodiments, the technology monitors input/output (IO) accesses to a storage system within a monitor period; tracks an access map for storage addresses within the storage system during the monitor period; and counts a particular access condition of the IO accesses based on the access map during the monitor period. When sizing a cache of the storage system that enables the storage system to provide a specified level of service, the counting is for computing a working set size (WSS) estimate of the storage system.

20 Claims, 14 Drawing Sheets

| Parameter | Simulation? | Description | Relationships |
|---|---|---|---|
| $VS$ | ✓ | The size of the dataset (in blocks) being monitored; e.g., volume size or aggregate size | Input to cache sizing |
| $C_{max}$ | ✓ | The maximum cache size (in blocks) that can be created | Input to cache sizing |
| $C_{min}$ | ✓ | The maximum cache size (in blocks) that can be created | $C_{min}$ is typically greater than $0.1 * C_{max}$; create multiple WSS estimators for larger min-max ranges |
| $A_{curve}$ | — | The duration (in number of accesses) for which the workload is monitored to create one miss-ratio curve | $A_{curve}$ should increase as $C_{max}$ increases (rule of thumb: $A_{curve} = 5 * C_{max}$); can be an input to cache sizing if monitoring constraints force it to be smaller; the parameter is not needed if the algorithm simply waits for unique block accesses to reach a threshold (some fraction of $C_{max}$) |
| $U_{max}$ | — | The minimum number of unique blocks that the WSS estimator may see | $U_{max} = min(VS, \alpha * C_{max}, A_{curve})$, where $\alpha$ is typically $>0.5$ |
| $BL$ | — | The bit length of hash values (i.e., hash of block addresses) used for WSS estimation | $BL = log_2(U_{max}) + \delta$, where $\delta$ is a small number, used for reducing aliasing due to hashing (suggested value is 3) |
| $A_{point}$ | — | One data point for the working set size curve is recorded every $A_{point}$ accesses | $A_{point}$ can increase as $U_{max}$ increases (suggested value: less than $U_{max}/1000$) |
| $SF$ | — | The fraction of hash values that are sampled (tracked) is $1/SF$ | $SF$ increases as $U_{max}$ and $A_{point}$ increase (suggested value: less than $A_{point}/10$) |
| $S$ | — | The number of miss-ratio curves that are averaged to create the output curve | Each miss-ratio curve needs $A_{curve}$ accesses |
| $A_{total}$ | ✓ | The complete duration for which a workload is monitored to produce an averaged miss-ratio curve | $A_{total} = S * A_{curve}$ |
| $M$ | ✓ | $M$ is not a parameter, but a result; it is the amount of memory used for WSS estimation | $M = (2^{BL}/SF)/8$ bytes |

*FIG. 12*

METHODS AND SYSTEMS FOR DETERMINING A CACHE SIZE FOR A STORAGE SYSTEM

FIELD OF INVENTION

The disclosed technology relates generally to a caching sizing system, and in particular to determining a cache size for fronting a storage server.

INTRODUCTION

A storage server is a computing device that provides storage services relating to the organization of data on writable, storage media, e.g., non-volatile memories, solid state drives, and disks. A storage server may be configured to operate according to a client/server model of information delivery to enable many workload sources (e.g., applications) to access the data served by the system. A storage server can employ a storage architecture that serves the data with both random and streaming access patterns at a file level, as in network attached storage (NAS) environments, at a storage object level, as in object storage environments, e.g., through Cloud Data Management Interface Protocol (CDMI), or at the block level, as in a storage area network (SAN). Other storage architectures may be employed. Storage servers (e.g., monolithic, non-distributed storage servers or clustered storage servers) store data on various types of non-volatile storage media, e.g., relatively high latency (i.e., longer access times) hard disk drive devices (HDDs) and relatively low latency (i.e., shorter access times) solid-state devices (SSDs), e.g., flash memory or dynamic random access memory (DRAM).

Large data farms including multiple storage servers, where each storage server has multiple volumes of data, can be useful in environments where many applications and users from multiple locations access data stored on the volumes. However, as these data farms grow larger, system throughput can be capped when a large number of applications or users are accessing the same data set on a particular storage volume (the origin storage volume), because the overall system throughput is limited by the throughput of the storage server hosting the origin storage volume. In addition to limited throughput, overall system performance may be further limited by network latency between a workload source and the storage server.

One solution to these limitations has been to fully replicate the origin storage volume on other storage systems so that the data set is available in multiple locations. However, full replication of large data sets can be expensive and hard to manage. Another more reasonable solution is to use sparse/cache volumes to cache the most frequently or most recently used files on high performance storage systems. A cache volume is a volume that appears to users and applications to be a replication of the origin storage volume, but does not contain all of the data from the origin storage volume.

Generally, cache volumes run on high performance storage hardware, e.g., high performance solid state drives. From the operational cost perspective, companies want to deploy these cache volumes with at least a minimum cache size to handle the workload of the application the storage system services, while minimizing the ultimate cache size to reduce the cost of the high performance storage hardware.

To determine an optimal cache size, companies may employ various workload simulation techniques. Simulation techniques emulate the whole system. Therefore, cache sizing via simulation is faced with many problems including large overhead of cache metadata and the time and I/O overhead of managing a stack in a block-based device. The overhead of multiple simultaneous cache simulation for different workloads can be enormous. Different storage systems may require different simulation techniques and thus the overhead of addressing a diversity of caches in the storage stack is also problematic.

BRIEF DESCRIPTION OF THE DRAWINGS

FIG. 12 is a table diagram illustrating of input and internal parameters for the cache sizing system, consistent with various embodiments.

The figures depict various embodiments of the disclosed technology for purposes of illustration only. One skilled in the art will readily recognize from the following discussion that alternative embodiments may be employed.

DETAILED DESCRIPTION

A dynamic cache sizing technology for a storage system servicing a workload, e.g., an application, is described ("the technology"). In various embodiments, the technology comprises a mechanism of tracking a input/output ("IO") access bitmap to count a particular access condition of the IO accesses during a monitor period for calculating various working set size ("WSS") estimation curves. In various embodiments, the technology overcomes the challenges of simulation memory overhead and diverse storage system reconfiguration overhead by employing a mechanism of storing read/write counters that are combined into various WSS estimation curves that are then used to predict a cache size for specified cache miss ratios.

The appropriate size for each cache or each cache partition of a storage system depends on the workload that the storage system serves. Specifically, knowing the missed ratio of the workload for caches of different sizes helps determine an appropriate cache size, e.g., depending on a specified required performance. Various embodiments generally relate to systems and methods for tracking WSS estimates for different write policy storage/cache systems. A WSS of a workload is the amount of unique data touched in an interval. An example of a WSS is one million blocks accessed in an interval during which ten million IO accesses were issued to the storage server. WSS estimates may be calculated differently for different write handling policies.

The techniques introduced provide various advantages, e.g., (i) memory-efficient collection of WSS data by use of bit-per-block data structures and access counters; (ii) adaptations for storage workloads, e.g., by averaging (default approach) or computing a maximum (conservative approach) of WSS estimates across iterations for longer-term applicability; and (iii) adaptations for storage needs, e.g., separation of read and write hit rates and dynamic generation of miss ratio curves for different write policies during curve-creation instead of during monitoring.

The techniques introduced may be implemented by a computing device. The computing device may include instructions for executing one or more of the techniques stored on a machine readable storage medium. For example, the computing device may execute the instructions via a processor.

Figure 1:
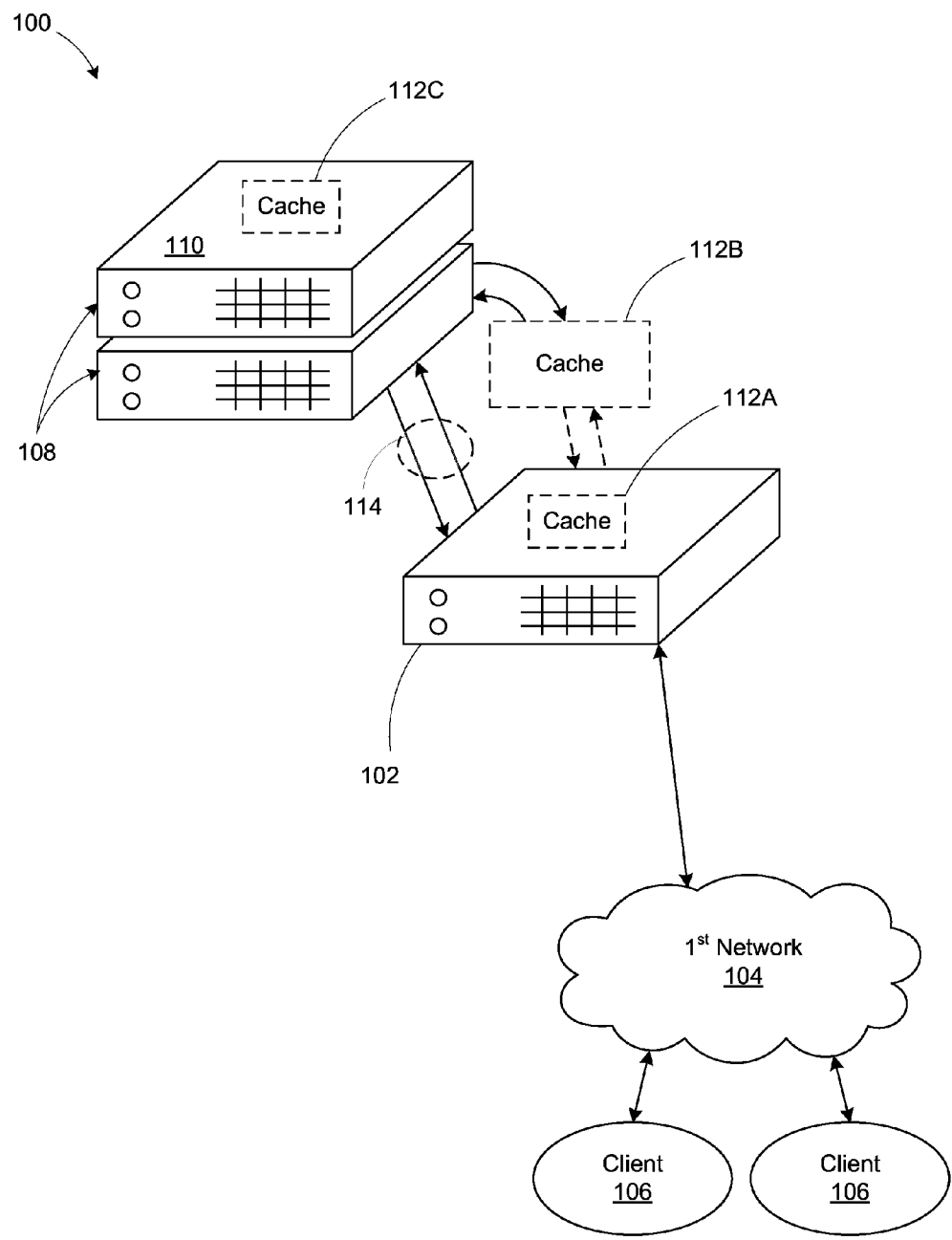
FIG. 1 is a block diagram illustrating a system environment for operating a cache sizing system, consistent with various embodiments.

FIG. 1 is a block diagram illustrating a system environment 100 for operating a cache sizing system, consistent with various embodiments. The system environment 100 includes an application server 102 in communication through a first network 104 with one or more clients 106. The application server 102 may store application-related user data and metadata, e.g., user profiles, multimedia files, user behavior files, application access metadata, any other type of file, or combinations thereof, on a storage system 108. The clients 106 may include general-purpose computing devices with computer functionalities configured to interact with an application service provided by the application server 102.

The storage system 108 may include a storage server 110. The storage server 110 may have one or more processors, a memory, a network adapter, a storage adapter, a buffer cache, various other components, or any combination thereof. The storage server 110 can be a computing device that provides storage services relating to the organization of information on writable, persistent storage media, e.g., SSDs and HDDs. The storage server 110 also includes a storage operating system that implements a file system to logically organize the stored data as a hierarchical structure of logical data containers (e.g., volumes, logical units, directories and/or files) on the electronic storage media and magnetic storage media.

To offload (e.g., reduce demands on various computing or networking resources) the storage server 110 or the storage system 108, a cache volume can be implemented. Three examples of cache volumes 112A, 112B, and 112C are illustrated (collectively "112"). The cache volume 112 is adapted to cache a portion of data stored on the storage system 108, e.g., the most frequently or most recently used files, on high performance storage devices. In some embodiments, the cache volume 112 is a storage volume appearing to applications and clients as a complete replication of an origin storage volume accessible from the storage system 108. However, the cache volume 112 may not contain all of the data from the origin storage volume.

The cache volume 112 may be implemented in various locations, e.g., at the application server 102, the storage server 110, or intermediate locations. As an example, a cache volume 112A is implemented at the application server 102. As another example, a cache volume 112B is implemented at a location that is neither at the application server 102 nor the storage system 108, but rather at an intermediate location (e.g., a separate device). As yet another example, a cache volume 112C is implemented in the storage system 108, either at a particular storage server 110 or distributed on multiple source servers.

The application server 102 may interact with the storage system 108 in accordance with a client/server model of information delivery. That is, the application server 102 may request data from the storage system 108, and the storage system 108 may return the results of the data requested by the application server 102, e.g., by exchanging packets over a second network 114 from the storage server 110 or the cache volume 112. The application server 102 may issue packets using various file-based access protocols (e.g., the Common Internet File System (CIFS) protocol or Network File System (NFS) protocol) over TCP/IP when accessing information in the form of files. Alternatively, the application server 102 may issue packets using block-based access protocols (e.g., Small Computer Systems Interface (SCSI) protocol encapsulated over TCP (iSCSI) or SCSI encapsulated over Fibre Channel Protocol (FCP)) when accessing information in the form of logical unit numbers (LUNs) or blocks. In yet another alternative, the application server 102 may issue packets using object storage access protocols (e.g., Cloud Data Management Interface (CDMI) protocol) when accessing information in the form of storage objects.

It will be understood by those skilled in the art that this description may apply to any type of special-purpose computing device (e.g., file server or storage serving appliance) or general-purpose computing device embodied as, or having a storage server including a standalone computing device or portion thereof. While FIG. 1 illustrates a monolithic, non-distributed storage server 110, various embodiments are applicable to other types of storage configurations (e.g., cluster storage configurations). Moreover, the teachings of this description can be adapted to various storage server architectures including, but not limited to, a network-attached storage (NAS), storage area network (SAN), or a disk assembly directly-attached to a client or host computer. The term "storage server" should therefore be taken broadly to include such arrangements, including a storage server that provides file-based access to data, block-based access to data, or both.

The first network 104 and/or the second network 112 may include a point-to-point (P2P) connection or a shared network. The first network 104 and/or the second network 114 may include a physical interconnect, e.g., a wire, a cable, or fiber optics; or a wireless interconnect, e.g., microwave, Wi-Fi, cellular network, or other wireless technologies. The first network 104 and/or the second network 114 can be any group of interconnected devices capable of exchanging information. In some embodiments, The first network 104 and/or the second network 114 may have as few as several personal computers, special purpose computers, and/or general purpose computers communicating via a Local Area Network (LAN) or a wide area network, e.g., the Internet. In some cases, the networks 104 and/or 112 may be comprised of multiple networks (private and/or public), heterogeneous networks (e.g., one or more border networks), broadband networks, service provider networks, Internet Service Provider (ISP) networks, and/or Public Switched Telephone Networks (PSTNs), interconnected via gateways operable to facilitate communications between and among the various networks.

Figure 2:
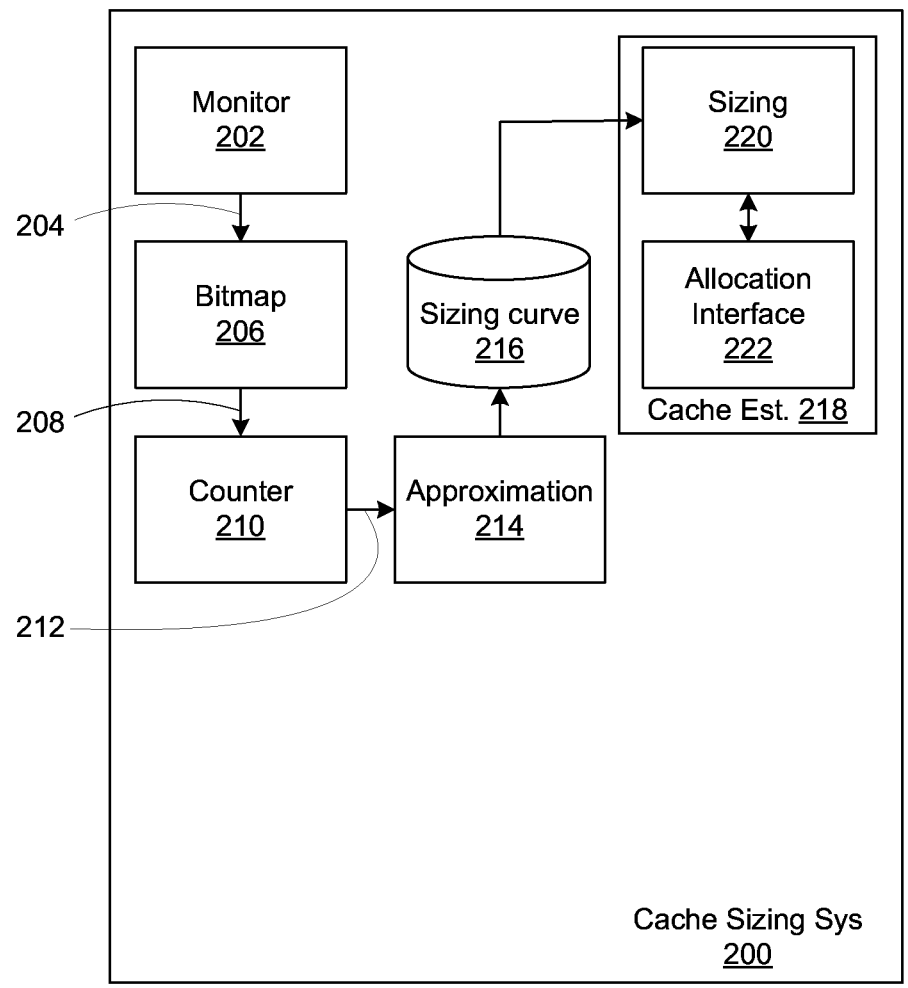
FIG. 2 is a block diagram illustrating a cache sizing system, consistent with various embodiments.

FIG. 2 is a block diagram illustrating a cache sizing system 200, consistent with various embodiments. The cache sizing system 200 may be implemented on a storage server, e.g., the storage server 110, an application server, e.g., the application server 102, an external computing device, an external computing system including multiple computing devices, or any combination thereof.

Blocks, components, and/or modules associated with the cache sizing system 200 may be implemented as hardware modules, software modules, or any combination thereof. For example, the modules described can be software modules implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Software modules may be operable when executed by a processor or other computing device, e.g., a single board chip, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via a communication module to coordinate its operations. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The cache sizing system 200 may include additional, fewer, or different modules for various applications.

The cache sizing system 200 includes a monitor module 202. The monitor module 202 may be coupled to an application server, where the application server accesses a storage system for which the cache sizing system 200 is determining a cache size. The monitor module 202 captures storage access metadata 204 for further processing by the cache sizing system 200.

Figure 4:
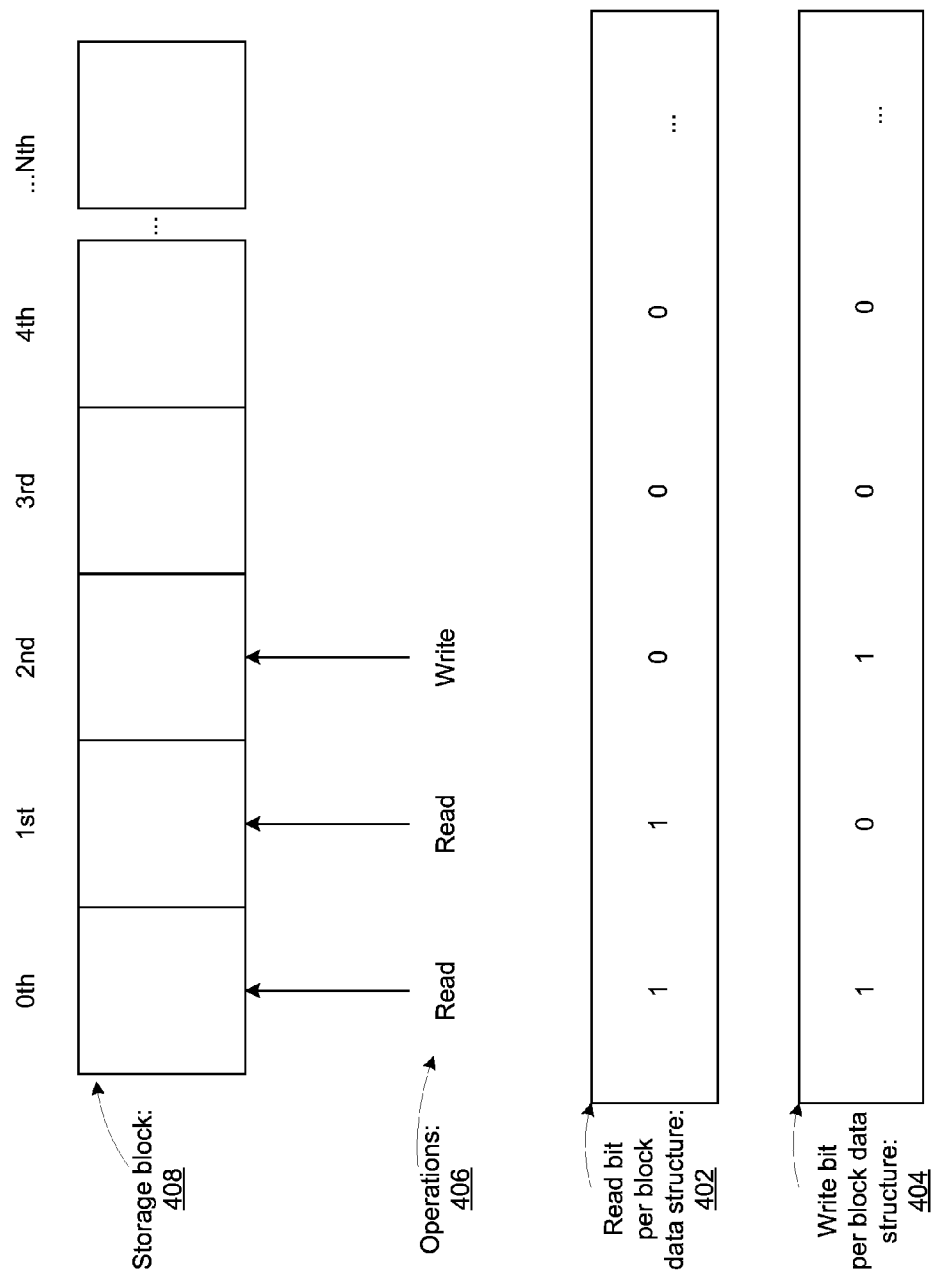
FIG. 4 is a data structure diagram illustrating bit-per-block (BPB) data structures for storing read/write operations to a storage system monitored by the cache sizing system, consistent with various embodiments.

The cache sizing system 200 includes a bitmap module 206 coupled to the monitor module 202. The bitmap module 206 is adapted to track whether one or more blocks within the storage system have been read or written to. For example, the bitmap module 206 can track by monitoring the storage access metadata 204. For example, the bitmap module 206 may be configured to track whether the blocks have been read or written to in one or more bit-per-block (BPB) data structures 208. In some embodiments, whether the blocks have been read is stored in a BPB data structure separate from a BPB data structure for whether the blocks have been written to. Examples of the BPB data structures 208 are shown in FIG. 4.

Figure 5:
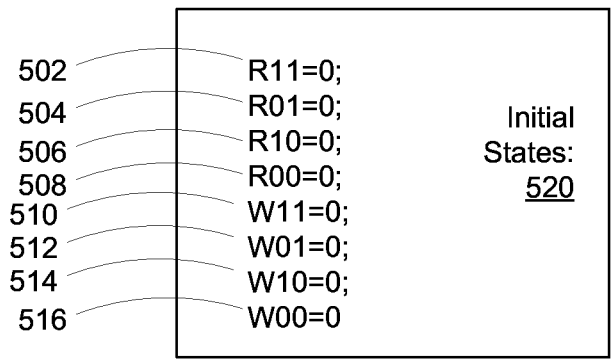
FIG. 5 is a data structure diagram illustrating access counter data structures for tracking read/write operations relative to a storage system monitored by the cache sizing system, consistent with various embodiments.
Figure 5:
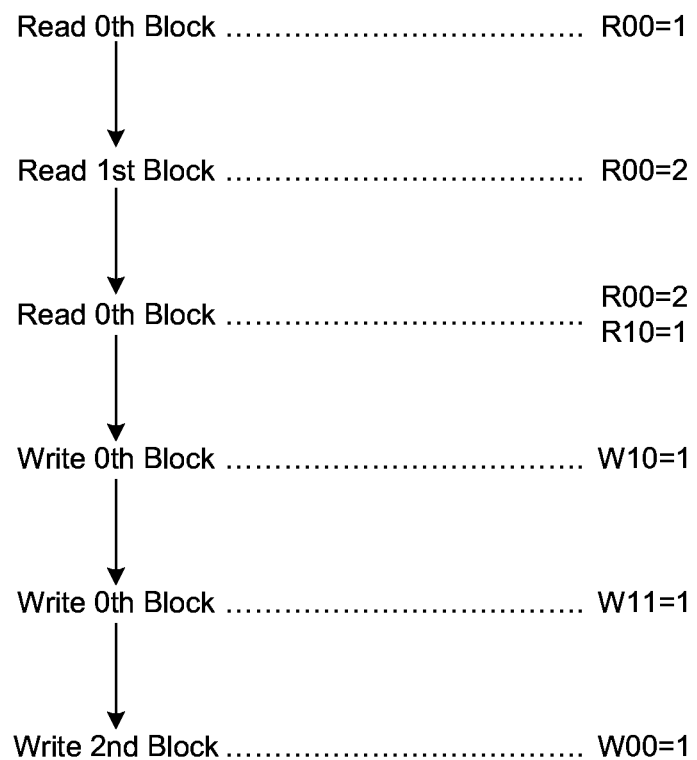

The cache sizing system 200 includes a counter module 210. The counter module 210 may be coupled to the bitmap module 206 or the monitor module 202. The counter module 210 is adapted to count a number of unique blocks that have been accessed under different circumstances of accessing. For example, the counter module 210 may be configured to increment eight different counters 212 stored on the cache sizing system 200. In some embodiments, the counter module 210 may reference the BPB data structures 208 to determine which of the counters 212 to update. Examples of access counter structures 212 are illustrated in FIG. 5.

The cache sizing system 200 includes an approximation module 214. The approximation module 214 may be coupled to the counter module 210. The approximation module 210 is adapted to generate WSS curves from the counters 212 based on a write policy of the storage system. WSS of a workload is the number of unique data blocks touched in a time interval, where the time interval can be defined by using either clock time or the total number of block accesses. The write policy determines the method of combining the counters 212 to generate a WSS curve. Examples of the write policies are illustrated in FIG. 6. Examples of the methods of combining the counters 212 are illustrated in FIG. 7.

Figure 8:
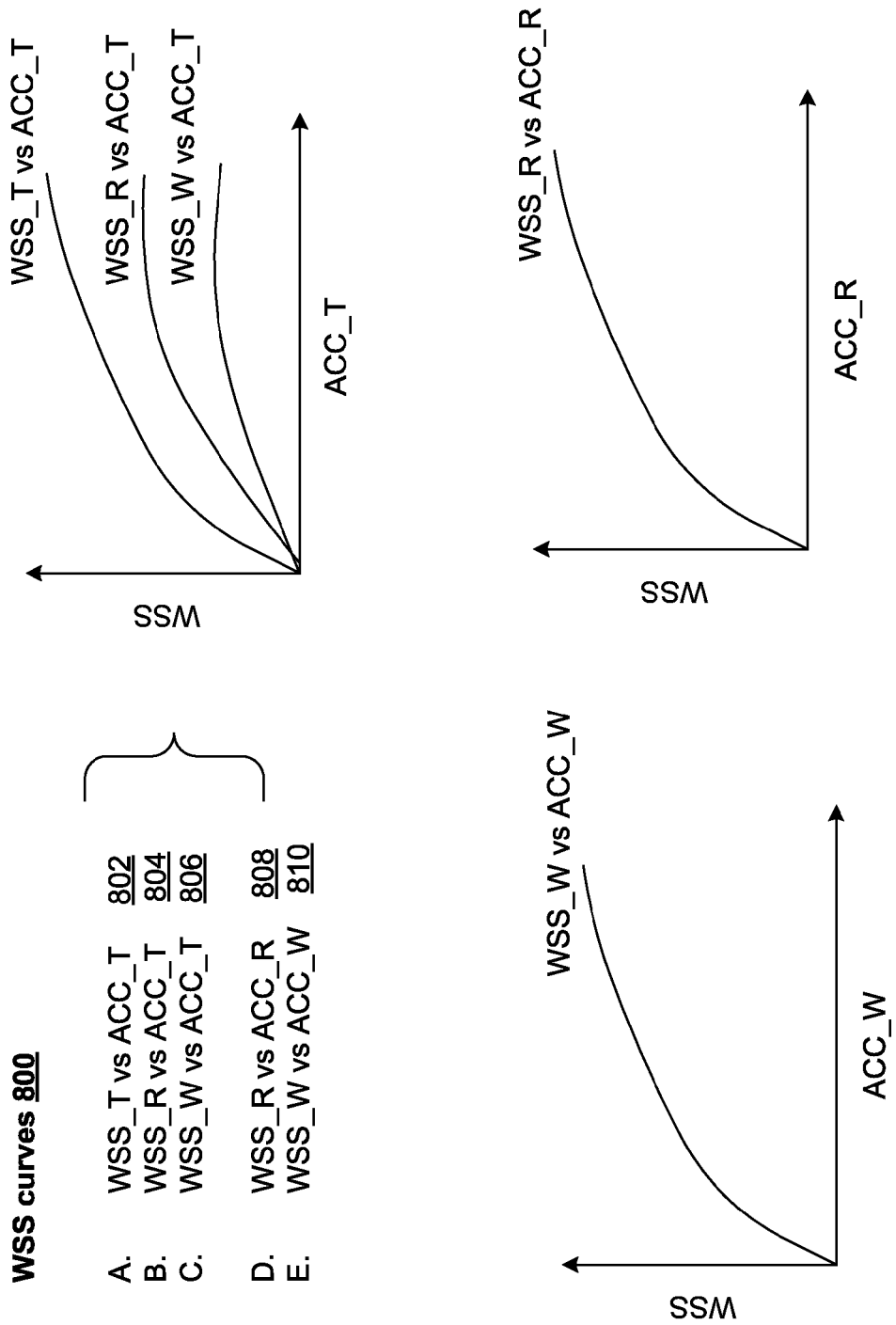
FIG. 8 is a chart diagram illustrating five different examples of WSS curves that may be used to generate a missed ratio curve, consistent with various embodiments.
Figure 9:
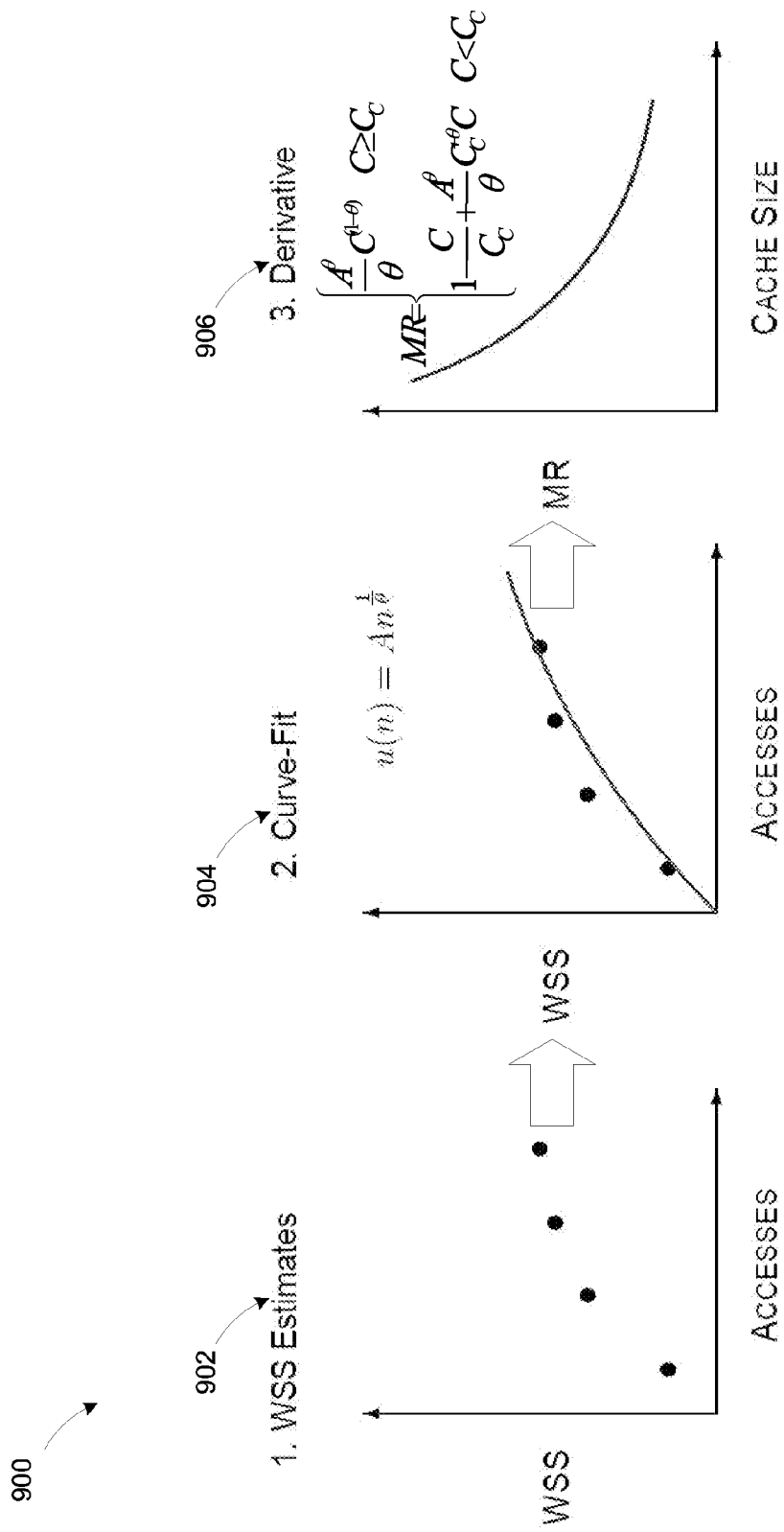
FIG. 9 is a chart diagram illustrating a process of transforming a plot of WSS estimates to a WSS curve and then to a miss ratio curve, consistent with various embodiments.

Different types of the WSS curves and miss ratio curves can be saved. For example, FIG. 8 is different types of WSS curves. The cache sizing system 200 may include a sizing curve store 216 where the WSS curves are stored. The approximation module 214 can further calculate a miss ratio curve by taking the derivative of the WSS curve. The miss ratio curve may be saved in the sizing curve store 216. An example of how the approximation module 214 generate the WSS curve and the miss ratio curve is illustrated in FIG. 9.

The cache sizing system 200 includes a cache estimation engine 218. In some embodiments, the cache estimation engine 218 may be outside of the cache sizing system 200. The cache estimation engine 218 includes a sizing module 220 and an allocation interface 222. The allocation interface 222 enables inputting of a desired miss ratio from a user or inputting a performance goal from which a desired miss ratio can be obtained. The allocation interface 222 may also enable specifying of other parameters, e.g., the intended write policy. In other embodiments, the cache sizing system 200 may automatically detect the write policy existing on the application server as the intended write policy. Given the desired miss ratio, the sizing module 220 can determine the cache size necessary to achieve the desired miss ratio by matching a point on a miss ratio curve on the sizing curve store 216. Which of the miss ratio curve to select from may be determined by the intended write policy, whether miss rate relates to read/write/total storage system access, user preferences, or any combination thereof.

Figure 3:
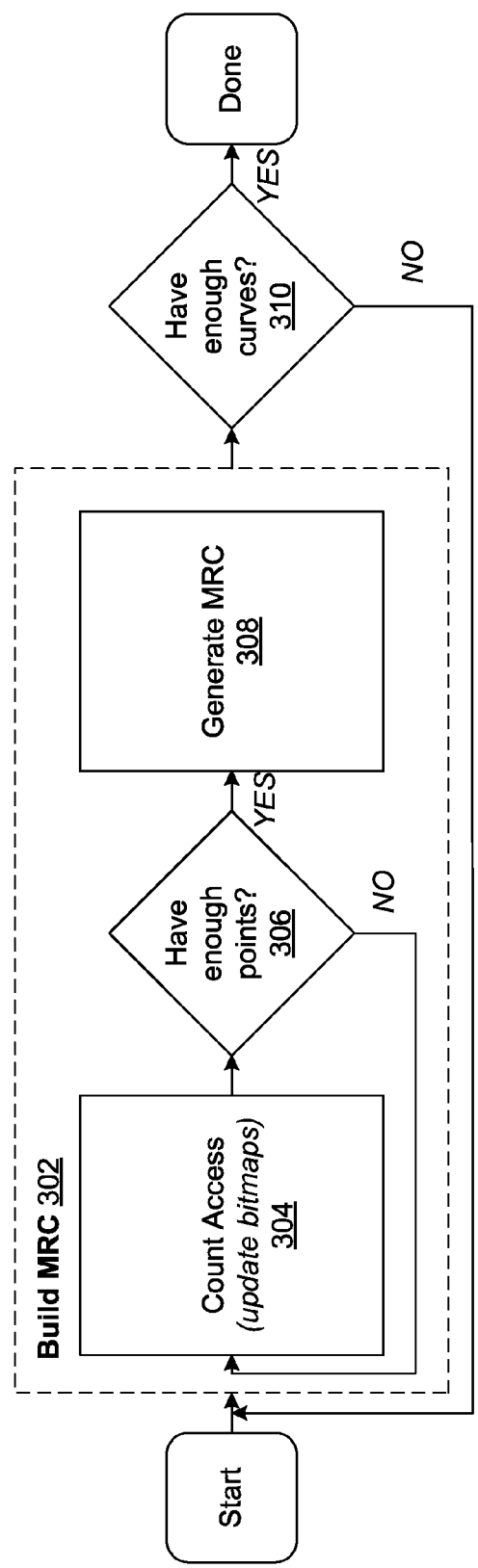
FIG. 3 is a flow chart illustrating a high-level method of operating the cache sizing system, consistent with various embodiments.

FIG. 3 is a flow chart illustrating a high-level method 300 of operating the cache sizing system, consistent with various embodiments. The cache sizing system, for example, can be the cache sizing system 200 of FIG. 2. The method 300 describes a method of building miss ratio curves for a particular application utilizing a storage system to estimate optimal cache sizes for the storage system at different miss ratio levels. An operator of the cache sizing system can input a miss ratio, and the cache sizing system can then use the miss ratio curves generated by the method 300 to determine the optimal cache size associated with the miss ratio.

The method 300 begins with a step 302 of building a miss ratio curve. The step 302 includes at least three sub-steps. First, the step 302 includes a sub-step 304 of counting accesses made to a storage system. Then, at a sub-step 306, the cache sizing system determines whether there are sufficient accesses made to cover a range of miss ratios. For example, the sufficiency of the accesses recorded may be determined by whether sufficient accesses have been made such that the most frequently accessed data blocks have all been accessed more than once (e.g., would have moved into a cache volume). When there are sufficient accesses made, a miss ratio curve is generated and stored at a sub-step 308. When there are insufficient accesses made, the sub-step 306 returns to the sub-step 304 to gather additional data. The step 302 is further discussed in "systems and methods for tracking working-set estimates with a limited resource budget," U.S. application Ser. No. 13/198,495, filed on Aug. 4, 2011, which is incorporated by reference in its entirety.

The technology described may include mechanisms to maintain the freshness of our estimations, and at the same time to capture the long-term trend of the workloads. For freshness, an iteration of the method step 302 is performed periodically, resetting the BPB data structures (e.g., bitmap) at the end of the iteration; the length of each iteration is represented by $A_{curve}$. The WSS starts at 0 and increases for each iteration. An iteration ends when the WSS at any time interval reaches the maximum WSS of interest ($U_{max}$), derived automatically from the largest cache that can be deployed ($C_{max}$).

When the step 302 completes, the cache sizing system determines whether there are enough miss ratio curves in a step 310. When the number of miss ratio curves is determined to be sufficient, the miss ratio curves are saved. The miss ratio curves may be utilized by a sizing module, e.g., the sizing module 220 of FIG. 2. In some embodiments, an average of the saved miss ratio curves is created to be used with the sizing module. The sizing module may be activated through a cache allocation interface that takes input of tolerable miss ratio to find an optimal size for the specific tolerable miss ratio. When the number of miss ratio curves is determined to be insufficient, the step 302 is repeated to generate more miss ratio curves to sufficiently estimate the behavior of the actual storage system. Whether there is a sufficient number of miss ratio curves may be based on a system-configurable or user-configurable constant threshold, e.g., 5 miss ratio curves.

The miss-ratios produced by multiple cache sizing iterations are averaged. Multiple iterations are performed for at least two reasons. First, one long iteration would result in "flattening" the WSS curve, which affects the predictions for smaller cache sizes. Second, one long iteration has only one data point for each WSS; this results in errors due to workload variability. The number of iterations (S) used to create the averaged curve depends on the amount of time available for monitoring (that is, monitoring could be performed over the entire duration for which the volume has existed).

Overall, this cache-sizing approach takes the dataset size (VS) and the maximum cache size ($C_{max}$) as input, observes the workload for a period of time based on the dataset and maximum cache size ($A_{total}$), and outputs a miss-ratio curve. The parameters described above (both input and internal) are further described in FIG. 12.

FIG. 4 is a data structure diagram illustrating bit-per-block (BPB) data structures for storing read/write operations to a storage system monitored by the cache sizing system, consistent with various embodiments. The BPB data structures includes a read BPB 402 and a write BPB 404. The BPB data structures are generated in response to a set of operations 406, e.g., a set of access operations monitored by the monitor module 202 of FIG. 2 and captured as the storage access metadata 204. The BPB data structures maintain a single access bit for each storage device (e.g., disk or SSD) block.

The read BPB 402 is a data structure comprising of individual digital bits in sequence, corresponding to data blocks in sequence, e.g., storage blocks 408. Each digital bit may indicate whether the corresponding data block has been read previously during a WSS estimation iteration of the cast sizing system. For example, a "1" may represent that the corresponding block has been read, and a "0" may represent that the corresponding block has not been read.

Similarly, the write BPB 404 is a data structure comprising of individual digital bits in sequence, corresponding to data blocks in sequence, e.g., the storage blocks 408. Each digital bit may indicate whether the corresponding data block has been written previously during a WSS estimation iteration of the cache sizing system. For example, a "1" may represent that the corresponding block has been written previously, and a "0" may represent that the corresponding block has not been written previously.

The BPB data structures are implemented as a memory efficient improvement from use of a hash table to store unique block addresses for access. The memory demands of a hash table are prohibitive for tracking large working sets (the overheads are similar to those for pure cache usage simulation).

The BPB data structures observe only a fraction of the address space as controlled by a sampling factor ("SF"), where it maintains access bits only for 1/SF of the address space. This sampling may reduce memory overheads. When estimating the WSS, the sampled WSS is multiplied by the sampling factor to report the total WSS.

One requirement for BPB is a linear address space that can be represented by a bitmap. This address space is readily available if the input is a physical volume block number (PVBN) or a logical block address (LBA). In the absence of a PVBN or a LBA, the block address including container id and block id (c_id and b_id) can be mapped to a single address of bit-length number of bits (BL). BL is the bit length of hash values of block addresses used for WSS estimation. BPB can use different address-space mapping policies. For example, the following schemes can generate a 30-bit address:

LUN (5 bits from c_id, 25 bits from b_id)
FILE (25 bits from c_id, 5 bits from b_id)
MD5 (30 bits from MD5 of {c_id, b_id})

LUN may be suitable for virtual disks, FILE may be suitable for NFS/NAS, and MD5 may be suitable for both. The bit length BL is automatically determined based on the maximum number of unique blocks (Umax) that may be encountered, which in turn is derived from maximum cache size $C_{max}$. BL, for example, can be limited by the equation: $BL=\log_2(U_{max})+$small_constant, wherein $U_{max}$ is the maximum number of unique blocks that the approximation module may see when estimating the WSS. The small_constant can be added to reduce aliasing due to hashing. Examples of these parameters are shown in FIG. 12.

MD5 also enables more representative sampling for BPB by randomizing the value space. To achieve this benefit, hashing of the address space can be used even when a linear address space is available—for example, with LBAs. A non-cryptographic hash, e.g., Jenkins' hash, may be used to reduce CPU overheads as compared to MD5. Jenkins' hash provides close to the same accuracy and memory overhead as MD5.

FIG. 5 is a data structure diagram illustrating access counter data structures for tracking read/write operations relative to a storage system monitored by the cache sizing system, consistent with various embodiments. For example, the access counter data structures may be the counters 212 of FIG. 2. The access counter data structures may include (1) a number 502 of read accesses where a previous read occurred and a previous write operation occurred, (2) a number 504 of read accesses where no previous read occurred and a previous write operation occurred, (3) a number 506 of read accesses where a previous read occurred and no previous write operation occurred, (4) a number 508 of read accesses where no previous read occurred and no previous write operation occurred, (5) a number 510 of write accesses where a previous read occurred and a previous write operation occurred, (6) a number 512 of write accesses where no previous read occurred and a previous write operation occurred, (7) a number 514 of write accesses where a previous read occurred and no previous write operation occurred, and (8) a number 516 of write accesses where no previous read occurred and no previous write operation occurred.

Initial states 520 of the counter data structures at the beginning of an iteration of the cache sizing system are all set to 0. The counter data structures can be updated in response to access operations 522, e.g., access operations monitored by the monitor module 202 of FIG. 2 and captured as the storage access metadata 204. For example, the operations 522 can be the operations 406 of FIG. 4. FIG. 5 illustrates sample updates 524 in response to the incoming access operations during an iteration of the WSS estimation. A counter module, e.g., the counter module 210, can quickly determine whether an increment to the counter data structures is needed by referencing the BPB data structures as illustrated by FIG. 4.

Figure 6A:
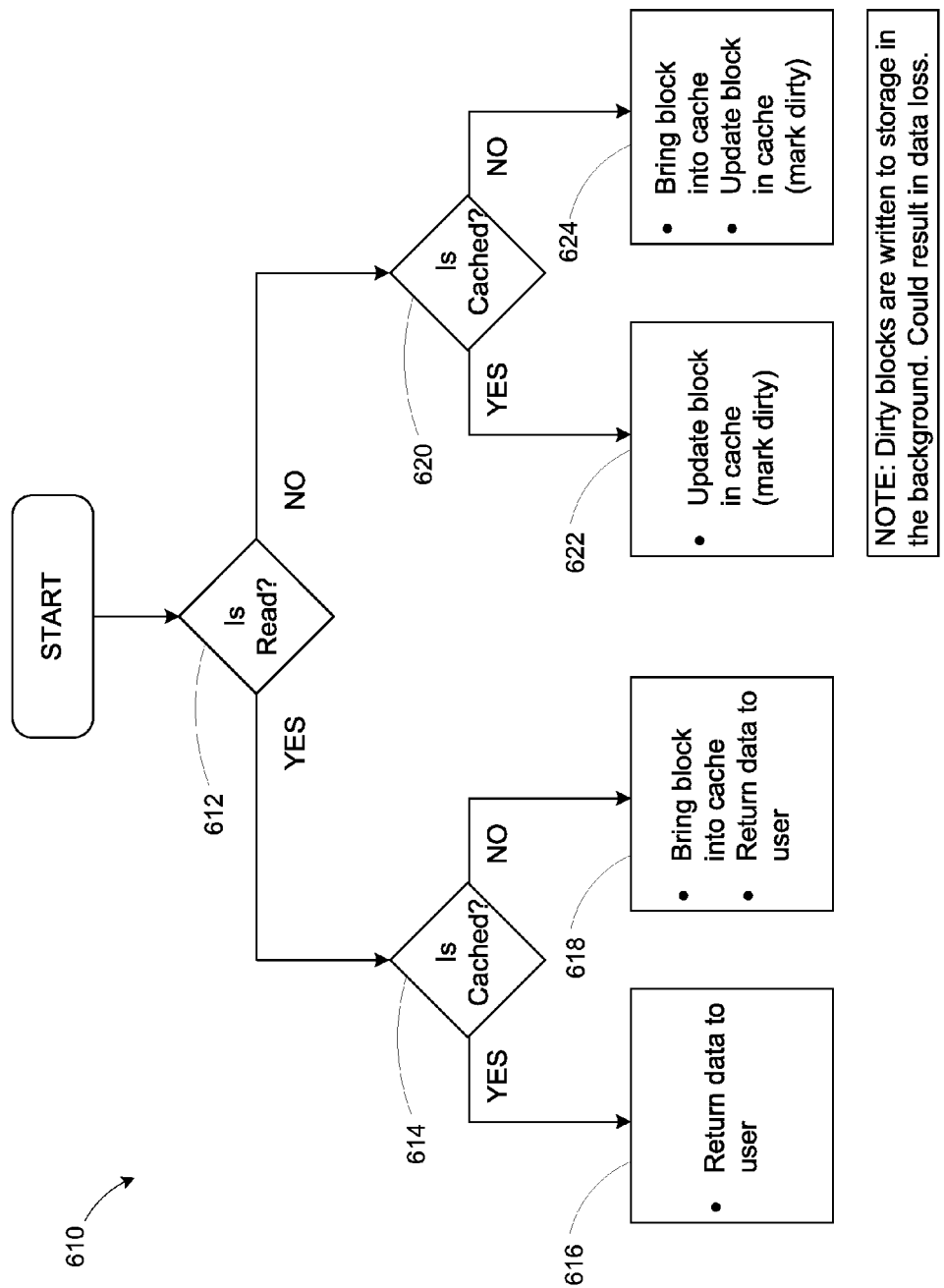
FIG. 6A is a flow diagram of a write-back policy process for a storage system monitored by the cache sizing system, consistent with various embodiments.
Figure 7:
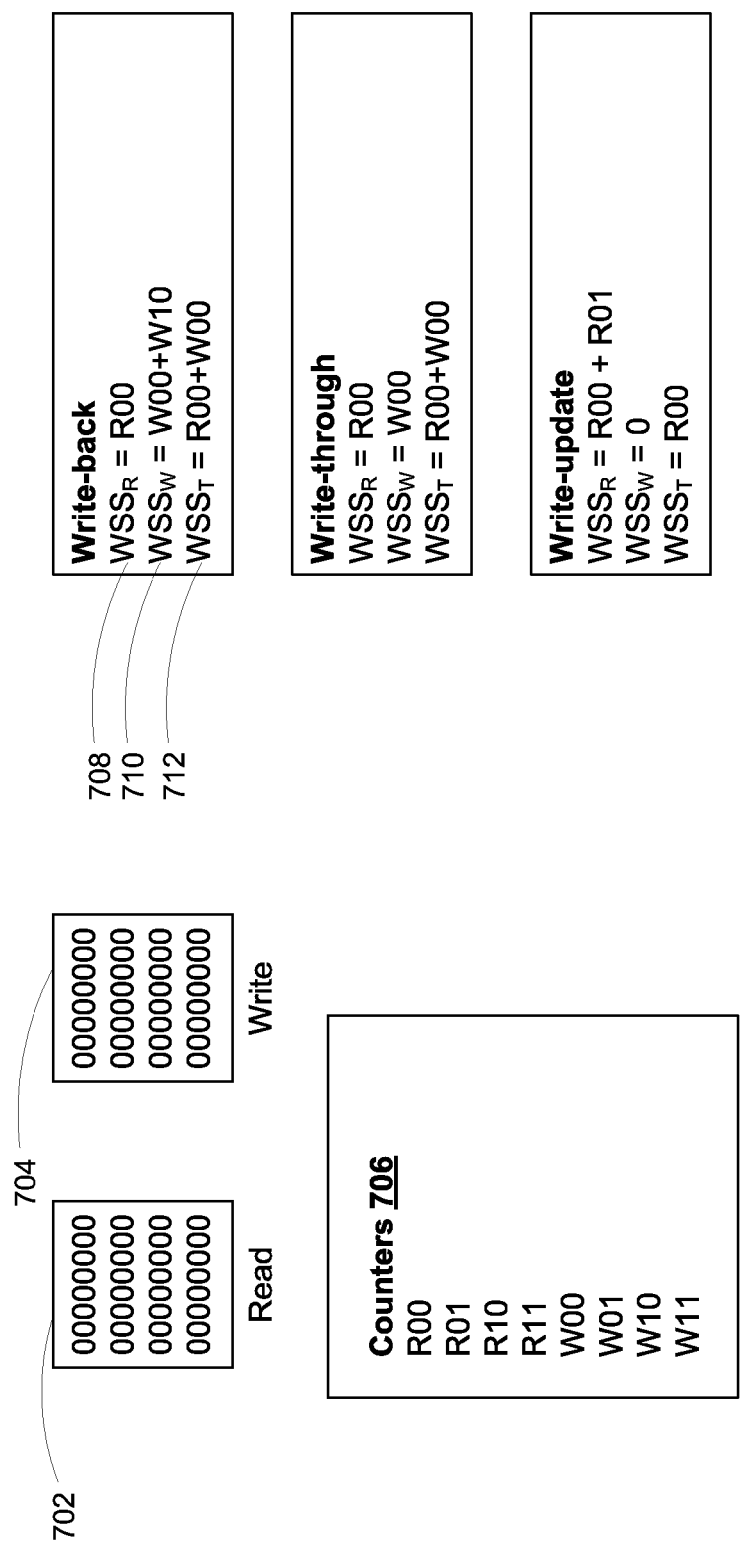
FIG. 7 is mechanisms for determining working set sizes ("WSSs") for different write policies based on a read BPB data structure, a write BPB data structure, and access counter data structures, consistent with various embodiments.

FIG. 6A is a flow diagram of a write-back policy process 610 for a storage system monitored by the cache sizing system, consistent with various embodiments. The storage system may include a cache volume servicing an origin volume. The write-back policy process 610 includes step 612 of determining whether or not an I/O access from a requester for a target block is a read operation. When the I/O access is determined to be a read operation, whether the target block is in the cache volume is determined in step 614. In response to the step 614, when the target block is determined to be within the cache volume, the target block in the cache volume is returned to the requester in step 616. In response to the step 614, when the target block is determined to be absent from the cache volume, the target block is copied into the cache volume from the origin volume and returned to the requester in step 618.

When the I/O access by the requestor for the target block is determined not to be a read operation (e.g., a write operation), whether the target block is in a cache volume is determined in step 620. The step 620 may be the same step as the step 614. In response to the step 620, when the target block is determined to be within the cache volume, the target block within the cache volume is updated via the write operation in step 622. In response to the step 620, when the target block is determined to be absent from the cache volume, the target block is copied into the cache volume and the target block copy at the cache volume is updated via the write operation in step 624.

Figure 6B:
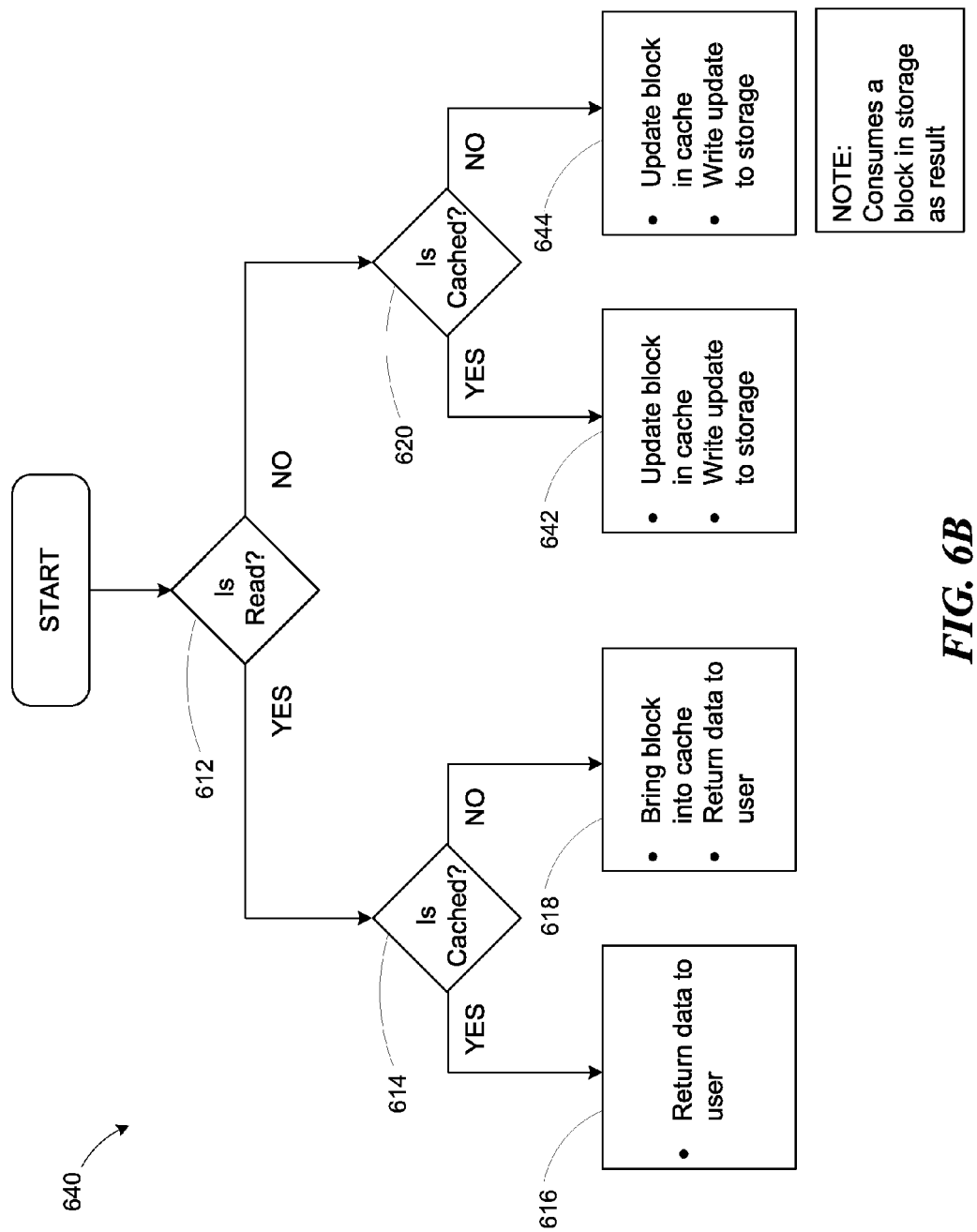
FIG. 6B is a flow diagram of a write-through policy process for a storage system monitored by the cache sizing system, consistent with various embodiments.

FIG. 6B is a flow diagram of a write-through policy process 640 for a storage system monitored by the cache sizing system, consistent with various embodiments. The write-through policy process 640 includes the same steps 612, 614, 616, 618, and 620, as the write-back policy process 610 of FIG. 6A. In response to the step 620, when the target block is determined to be within the cache volume, the target block is updated via the write operation and the updated target block is updated into the storage system as well in step 642. In response to the step 620, when the target block is determined to be absent from the cache volume, the target block is stored and updated within the cache volume, and the origin volume of the storage system is also updated in step 644.

Figure 6C:
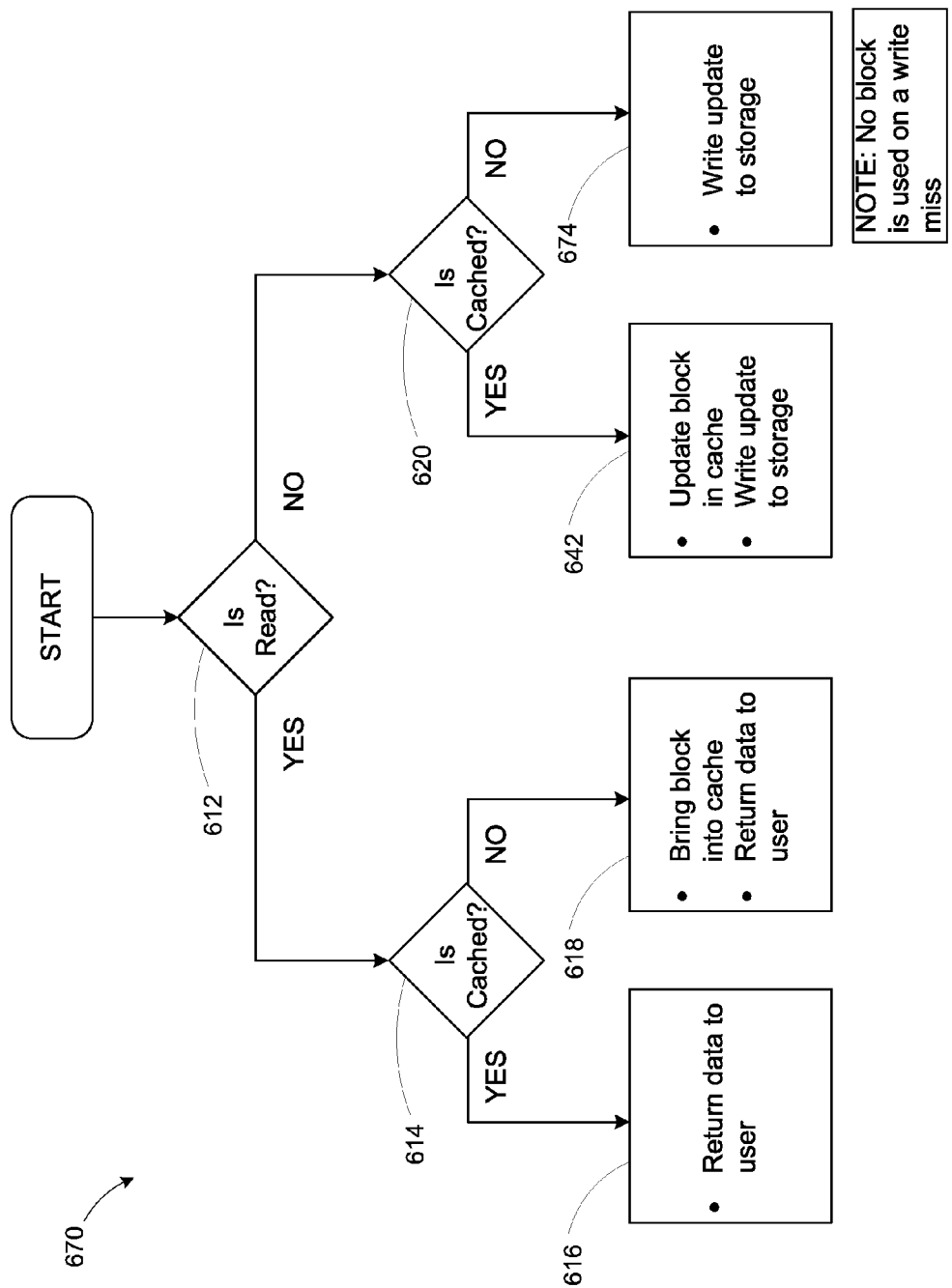
FIG. 6C is a flow diagram of a write-update policy process for a storage system monitored by the cache sizing system, consistent with various embodiments.

FIG. 6C is a flow diagram of a write-update policy process 670 for a storage system monitored by the cache sizing system, consistent with various embodiments. The write-update policy process 670 includes the same steps 612, 614, 616, 618, 620, and 642, as the write-through policy process 640 of FIG. 6B. However, in response to the step 620, when the target block is determined to be absent from the cache volume, the target block updated at the origin volume in step 674.

FIG. 7 is mechanisms for determining working set sizes ("WSSs") for different write policies (e.g., the write policies illustrated in FIG. 6A-6C) based on a read BPB data structure 702 (e.g., the read BPB data structure 402 of FIG. 4), a write BPB data structure 704 (e.g., the write BPB data structure 404 of FIG. 4), and access counter data structures 706 (e.g., the counters 212 of FIG. 2), consistent with various embodiments. Under a write-back policy, a read access WSS 708 is set to be the number 508 of FIG. 5; a write access WSS 710 is set to be the number 516 plus the number 514 of FIG. 5; and a total access WSS 712 is set to be the number 508 plus the number 516. Under a write-through policy, the read access WSS 708 is set to be the number 508; the write access WSS 710 is set to be the number 516; and the total access WSS 712 is set to be the number 508 plus the number 516. Under a write-update policy, the read access WSS 708 is set to be the number 508 plus the number 504 of FIG. 5; the write access WSS 710 is set to be 0; and the total access WSS 712 is set to be the number 508.

FIG. 8 is a chart diagram illustrating five different examples of WSS curves 800 that may be used to generate a missed ratio curve, consistent with various embodiments. The WSS curves 800 may include WSS for reads, WSS for writes or WSS for total accesses. The different WSS curves 800 are adapted particular for different storage needs, e.g., separation of read and write hit rates. Because read and write operations produce different hit rates and thus impact workloads differently, the read and write WSS curves are separated to provide valuable resolution in estimating cache sizes associated with different miss ratios.

For an overview of the total workload, a total access WSS curve 802 is illustrated, where a WSS curve may be fitted against a count of total accesses to the storage system. Two perspectives of the read operation workload are calculated. A normalized read access WSS curve 804 may be fitted against a count of total accesses to the storage system. A read access WSS 808 may be fitted against a count of total read operations. Two perspectives of the write operation workload are also calculated. A normalized write access WSS curve 806 may be fitted against a count of total accesses to the storage system. A write access WSS 810 may be fitted against a count of total write operations. All of the WSS curves can be calculated and fitted in the same way as illustrated in FIG. 9.

FIG. 9 is a chart diagram illustrating a process 900 of transforming a plot of WSS estimates 902 to a WSS curve 904 and then to a miss ratio curve 906, consistent with various embodiments. This process describes an example approach to estimate the cache-size requirements of each workload. The output of the process 900 is the miss-ratio curve 906 for the workload; the miss ratio curve 906 provides the miss ratios that would be obtained with different cache sizes. In this case, miss ratio is defined as the fraction of block accesses that will cause block accesses to the back-end storage instead of a cache, e.g., the cache 112 of FIG. 1.

Calculating the cache needs of storage workloads poses a unique set of challenges: (i) tracking block accesses in the data path, (ii) monitoring workloads for long periods of time, and (iii) monitoring multi-terabytes (TB) datasets and estimating the benefits of large caches. The process disclosed herein has been discovered to overcome these challenges. Specifically, this process 900 does not require use of specialized hardware, scales well with the dataset size or cache size, does not need to track on-disk data, and is memory efficient by leveraging the BPB data structures and the counter data structures to estimate the workloads.

In a first step, the WSSs 902 are calculated at increasing time intervals. For example, the WSS estimates 902 can be monotonically increased for 10K block accesses, 20K block accesses, and so on. The WSS estimates 902 are then plotted on a curve against the different block accesses counts.

In a second step, a curve 904, based on the equation:

$$u(n) = An^{1/\theta} \qquad (1)$$

is fitted to the WSS estimates 902 calculated in the first step. For example, the WSS curve 904 can be anyone of the different WSS curves 800 illustrated in FIG. 8. In the equation, u(n) represents a fitted WSS curve 904, where "n" represents a count of a particular type of access issued by the workload. "A" and "θ" represent adjustable variables for fitting the WSS estimates 902 to minimize differences between the WSS estimates 902 and the WSS curve 904.

When sizing multiple caches, the blocks accessed at each additional level is a miss at the previous level. During monitoring, the cache size at each level is unknown (i.e., that is what is being estimated). Therefore, the cache sizing system needs to be able to transform the information recorded at monitoring time to size multiple cache levels. The curve parameters "A" and "θ" derived from curve fitting can be used for multi-level sizing by assuming that each level is bigger than the previous level, and that the present level loses hits at the previous level. The fitted curve 904 for each level can be transformed by converting the initial part of the fitted curve 904 to a line of slope '1' until the working set reaches the cache size of the previous level. Then, we can refit the WSS curve 904 to obtain 'A' and 'θ' for this level and so on.

At a last step, a miss ratio curve 906 is calculated from the slope (i.e., derivative) of the fitted curve 904 at different points on the fitted curve 904. For example, the miss ratio curve 906 (MR) as a function of cache size (C) may be calculated by the following equation:

$$MR(C) = \frac{A}{\theta} C^{1-\theta} \qquad (2)$$

The miss-ratio curve produced by the cache sizing system can be used as follows. In the simplest case, the required miss ratio can be determined such that the residual I/O intensity (incoming throughput multiplied by the miss ratio) can be handled by the rest of the storage stack below the cache. For example, consider a workload that has a miss ratio of 50% for a 4 GB cache, 25% for an 8 GB cache, and 20% for a 16 GB cache. Assuming that the throughput requirement for the workload is 1000 input/output operations per second (IOPS) and that the cache sizing system determines that the rest of the storage stack can provide 250 IOPS, the cache sizing system should select the cache size that provides a miss ratio of (250/1000)=25%; that is, an 8 GB cache. A similar approach can be constructed to determine the cache size needed to satisfy average latency requirements.

In some embodiments, the miss-ratio of the cache may be divided to two parts, before and beyond a critical cache size $C_C$. When the cache size is below $C_C$, the miss ratio decreases linearly from 1 to 1/θ as the cache size increases from 0 to $C_C$. In this implementation example, the miss ratio is described by the following equation:

$$MR = \begin{cases} \frac{A^\theta}{\theta} C^{(1-\theta)} & C \geq C_C \\ 1 - \frac{C}{C_C} + \frac{A^\theta}{\theta} C_C^{-\theta} C & C < C_C \end{cases} \qquad (3)$$

where MR is the miss-ratio of the workload for a cache containing C blocks, A and θ are the constants from the WSS equation (Equation 1), and $C_C$ is the critical cache size. The critical cache size is a constant as defined by the equation:

$$C_C = A^{\frac{\theta}{(\theta-1)}} \qquad (4)$$

The first step may operate in a data path from an application server/system to a storage system, and may execute within the storage system. Therefore, the first step is the primary focus from an overhead standpoint. The other steps can be performed either on the storage system, the application system, or elsewhere, e.g., on a management server.

Each of the steps is configurable based on a set of parameters. The required inputs are the maximum cache size, $C_{max}$, for which miss ratios are being estimated, and the size of the dataset, e.g., volume size (VS). Other parameters are derived from these two parameters, or can be specified statically. All of the parameters are summarized in FIG. 12.

Figure 10:
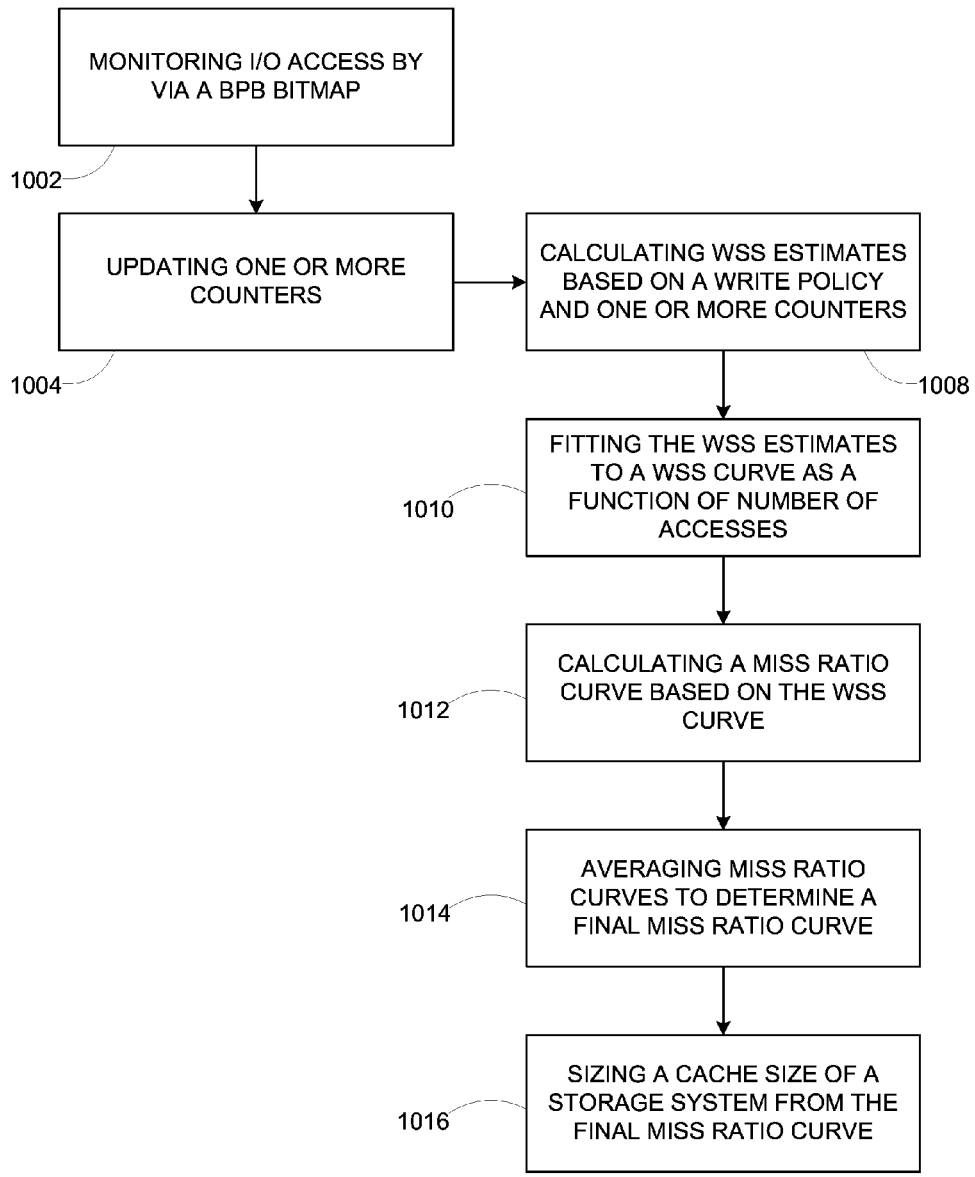
FIG. 10 is a flow diagram illustrating a method of operating the cache sizing system, consistent with various embodiments.

FIG. 10 is a flow diagram illustrating a method 1000 of operating the cache sizing system, consistent with various embodiments. The cache sizing system, for example, can be the cache sizing system 200 of FIG. 2. The method 1000 includes a step 1002 of monitoring I/O access via a BPB bitmap, e.g., the BPB data structures 208 of FIG. 2. In some embodiments, the monitoring includes monitoring I/O access at every sample interval. At a step 1004, one or more counters of specific types of accesses, e.g., the counters 212 of FIG. 2, are updated in accordance with the BPB bitmap.

In the examples given in figures above, the counters includes dividing types of I/O accesses into read and write operations. It is understood that other types of division of I/O accesses may be tracked via one or more counters. For example, whether a particular block is accessed for its metadata may be tracked via a metadata counter. Similarly, whether a particular block is access for its user data may be tracked via a user data counter. In another example, whether a particular block access is part of a pre-fetchable access (e.g., sequential) may be tracked via a pre-fetchable counter and whether a particular block access is part of a non-pre-fetchable access (e.g., random) may be tracked via a random access counter. Each of these counters may be supported by a BPB structure as well.

In a step 1008, WSS estimates are calculated based on a write policy and the one or more counters. A WSS curve as a function of the number of accesses is then fitted to the WSS estimates in a step 1010. With the WSS curve, a miss ratio curve may be calculated in a step 1012. For example the miss ratio curve may be calculated as a derivative of the WSS curve.

Optionally, the method 1000 may include a step 1014 of averaging miss ratio curves including the miss ratio curve calculated in the step 1012 to determine a final miss ratio curve. The step 1014 provides a solution to mitigate variance caused by workload variation, insufficient of workload sampling, or curve fitting errors. In some embodiments, a variance amongst the miss ratio curves and/or a variance amongst the WSS curves are calculated and presented to an operator of the cache sizing system.

The method 1000 includes a step 1016 of sizing a cache size of a storage system from the final miss ratio curve. Since missed ratio curve is plotted against potential cache size, a particular cache size may be determined by input of a desired miss ratio need.

Figure 11:
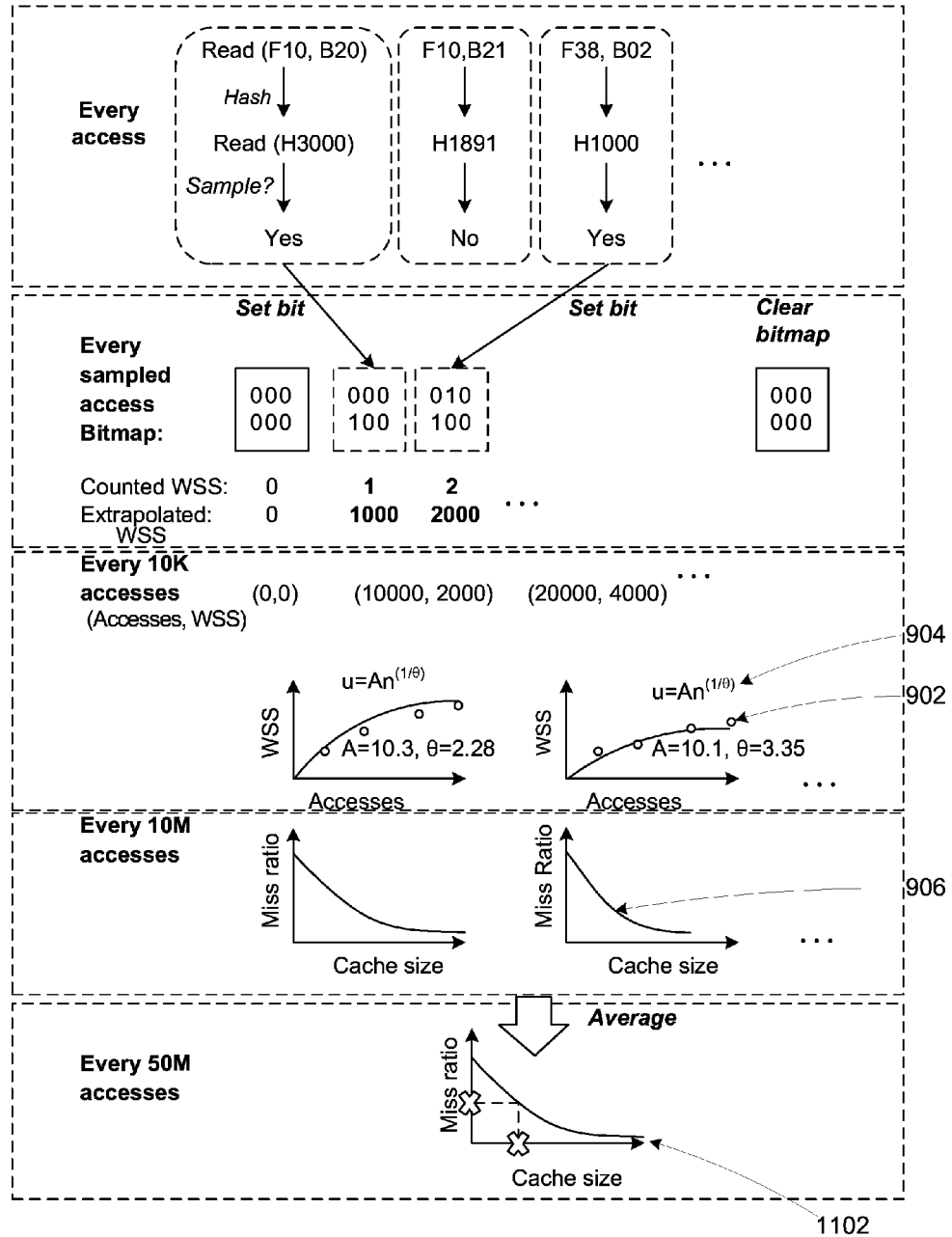
FIG. 11 is an example data flow of a method of operating the cache sizing system, consistent with various embodiments.

FIG. 11 is an example data flow of a method of operating the cache sizing system, consistent with various embodiments. The cache sizing system, for example, can be the cache sizing system 200 of FIG. 2. This data flow is an example to describe the steps taken by the cache sizing system to compute the miss-ratio curve. The cache sizing system works at five different time scales: (i) on each access, the access is determined whether it falls on a sample interval; (ii) on each sample interval access, the address of the data block is sampled and the corresponding bit in the bitmap is set; (iii) after every $A_{point}$ accesses, the current WSS is recorded; (iv) after every $A_{curve}$ accesses, a miss-ratio curve is generated by using a set of WSS estimates; and (v) after every $A_{total}$ accesses, S miss-ratio curves are combined to generate the final miss-ratio curve. FIG. 11 shows in detail the actions taken by the cache sizing system in each time scale. In the example, the cache sizing system is configured with SF=1000, $A_{point}$=10K, $A_{curve}$=10M, $A_{total}$=50M, and S=5. The primary data structures are a bitmap that tracks unique accesses to blocks, e.g., the BPB data structures 208, a list of WSS estimates over a period of time, e.g., the WSS estimates 902, a list of miss-ratio curves, e.g., the miss ratio curve 906, and a final miss-ratio curve 1102. Initially, the bitmap is unset (all bits are set to 0), the list of WSS estimates is empty, and the curves are undefined.

Every I/O Access: On each I/O access, a data block is requested. For example, FIG. 11 shows that the first command is an I/O read command to read block (F10, B20)—that is, block 20 from file 10 is to be read. The block address is hashed (such as MD5 or Jenkins) into a hash value; for example, block address (F10, B20) is hashed into value 3000 and sampled. Address-space sampling allows the cache sizing system to predict the WSS estimates of a workload by monitoring a fraction of the workload's block address space. The block request to hash value 3000 is part of the sampled address space, so the cache sizing system proceeds to update the bitmap.

Every Sampled Access: For each sampled hash value, if the corresponding bit is 0, it indicates that the block has not been previously accessed. Therefore the sampled WSS is incremented by 1, resulting in the overall (extrapolated) WSS being incremented by 1000 (the sampling factor SF). In contrast, the second I/O request to block (F10, B21) (hash value 1891) is not in the sampled address space and therefore no further processing occurs.

Every $A_{point}$ Accesses: After every $A_{point}$ accesses, e.g., 10K accesses, the number of accesses and the WSS are outputted and collected in a list. FIG. 11 illustrates two such values (10000, 2000) and (20000, 4000), indicating that 2,000 unique blocks were accessed in the first 10,000 I/O accesses and another 2,000 unique blocks were accessed in the second 10,000 I/O accesses. $A_{point}$ may be referred to as a monitor period.

Every $A_{curve}$ Accesses: After every $A_{curve}$ I/O accesses, e.g., 10M I/O accesses, the cache sizing system would have collected a set of WSS estimates. In this example, the cache sizing system would have collected 1,000 estimates. At this time, the cache sizing system fits the collected estimates to Equation 1 and obtains the best fit for parameters A and θ. At the same time, the bitmap is reset; all bits are set to 0 and reused for the next $A_{curve}$ I/O accesses. For example, it is shown that that for the first 10M I/O accesses, the best fit of Equation 1 was when parameter A=10.3 and parameter θ=2.28. The fitted curve can be fully described using just A and θ; the cache sizing system collects these values in a list. The fit parameters (A, θ) can also be used to compute the miss ratio, using Equation 4.

Every $A_{total}$ Accesses: After every $A_{total}$ I/O accesses, e.g., 50M I/O accesses, the cache sizing system has 5 (the parameter S) miss-ratio curves representing the workload's cacheability for the last S access segments. The miss-ratio predictions of the last 5 curves are averaged to provide the final cache miss-ratio curve.

All of the parameters controlling the size of iterations of these five stages are configurable on a system level. For example, these parameters may be user-specified. FIG. 12 is a table diagram illustrating of input and internal parameters for the cache sizing system, consistent with various embodiments.

What is claimed is:

1. A method of operating a cache sizing system, comprising:
    monitoring input/output (IO) accesses to a storage system within a monitor period;
    tracking an access map for storage addresses within the storage system during the monitor period; and
    counting a particular access condition of the IO accesses based on the access map during the monitor period, wherein, when sizing a cache of the storage system that enables the storage system to provide a specified level of service, the counting is for computing a working set size (WSS) estimate of the storage system.

2. The method of claim 1, wherein tracking the access map is performed by tracking whether a storage address has been accessed by a particular type of access in a bitmap structure mapping a bit to the storage address.

3. The method of claim 2, wherein the particular type of access includes read access or a write access.

4. The method of claim 2, wherein counting the particular access condition includes updating a counter of IO accesses under the particular access condition, wherein the particular access condition includes whether a storage address being accessed has previously been accessed by the particular type of access.

5. The method of claim 1, further comprising:
    calculating the WSS estimate based on the tracking of the particular type of IO access;
    fitting WSS estimates including the calculated WSS estimate to a WSS curve; and
    calculating a miss ratio curve based on the WSS curve for sizing the cache of the storage system.

6. The method of claim 5, further comprising iterating through the method of claim 5 to produce multiple miss ratio curves; and averaging the multiple miss ratio curves to generate a final miss ratio curve for sizing the optimal cache size.

7. The method of claim 6, further comprising computing a variance of the multiple miss ratio curves in association with the final miss ratio curve for determining an accuracy of the final miss ratio curve.

8. The method of claim 1, further comprising determining a write policy intended for the cache of the storage system after the monitor period ends; and calculating the WSS estimate for the write policy for the monitor period.

9. A method of operating a cache sizing system comprising:

monitoring input/output (IO) accesses to a storage system within a monitor period;
tracking a particular type of the IO accesses during the monitor period;
computing a working set size (WSS) estimate for a particular IO access condition based on the tracking of the particular type of the IO accesses;
fitting WSS estimates including the calculated WSS estimate to a WSS curve; and
computing a miss ratio curve based on the WSS curve for sizing a cache of the storage system.

10. The method of claim 9, wherein tracking includes tracking the particular type of the IO accesses on a bit-per-block (BPB) bitmap; and wherein the BPB bitmap corresponds to storage addresses in sequence.

11. The method of claim 10, wherein the storage addresses are hash addresses in sequence and wherein the hash addresses reference physical addresses of the storage system through a hash function.

12. The method of claim 10, wherein the storage addresses in sequence are separated by a sampling interval in a storage address space of the storage system.

13. The method of claim 9, wherein tracking the particular type of the IO accesses includes tracking whether a storage address has been written to by toggling a single bit in a write access BPB bitmap, the single bit corresponding to the storage address.

14. The method of claim 9, wherein tracking the particular type of the IO accesses includes tracking whether a storage address has been read by toggling a single bit in a read access BPB bitmap, the single bit corresponding to the storage address.

15. The method of claim 9, wherein calculating the WSS estimate for the particular type of IO access includes calculating the WSS estimate for IO accesses to metadata storage addresses.

16. The method of claim 9, wherein calculating the WSS estimate for the particular type of IO access includes calculating the WSS estimate for prefetchable IO accesses.

17. The method of claim 9, wherein calculating the WSS estimate for the particular type of IO access includes calculating the WSS estimate for IO accesses to a storage address of a pre-defined type.

18. The method of claim 9, further comprising adjusting the WSS curve when the cache of the storage system is a multi-level cache, such that for each level of the multi-level cache, a slope of the WSS curve is set to a constant until WSS estimate reaches a cache level size of a previous level.

19. A cache sizing system, comprising:
a computer readable storage medium having instructions stored thereon;
wherein the instructions, when executed by a processor, are operable to:
monitor input/output (IO) accesses to a storage system within a monitor period;
track a particular type of the IO accesses to storage addresses of the storage system on a bit-per-block (BPB) bitmap during the monitor period, wherein the BPB bitmap maps to at least a portion of the storage addresses; and
update a counter of the IO accesses under an access condition for estimating a working set size (WSS) of a cache of the storage system, wherein the access condition includes whether a storage address being accessed has previously been accessed by the particular type of access.

20. The cache sizing system of claim 19, wherein the instructions, when executed by a processor, are further operable to:
calculate the WSS estimate based on at least the counter;
fit WSS estimates including the calculated WSS estimate to a WSS curve; and
calculate a miss ratio curve based on the WSS curve for sizing an optimal cache size for a cache of the storage system.

* * * * *